US008952097B2

(12) United States Patent
Finter et al.

(10) Patent No.: US 8,952,097 B2
(45) Date of Patent: Feb. 10, 2015

(54) SHAPE MEMORY MATERIAL BASED ON A STRUCTURAL ADHESIVE

(71) Applicant: Sika Technology AG, Baar (CH)

(72) Inventors: Jürgen Finter, Zürich (CH); Matthias Gössi, Uster (CH)

(73) Assignee: Sika Technology AG, Baar (CH)

( * ) Notice: Subject to any disclaimer, the term of this patent is extended or adjusted under 35 U.S.C. 154(b) by 0 days.

(21) Appl. No.: 13/627,502

(22) Filed: Sep. 26, 2012

(65) Prior Publication Data

US 2013/0186562 A1 Jul. 25, 2013

Related U.S. Application Data

(63) Continuation-in-part of application No. PCT/EP2011/054647, filed on Mar. 25, 2011.

(30) Foreign Application Priority Data

Mar. 26, 2010 (EP) .................................... 10158077

(51) Int. Cl.
C08L 63/00 (2006.01)
C08L 63/02 (2006.01)
C08L 63/04 (2006.01)
C09J 163/00 (2006.01)
C08G 59/42 (2006.01)
C08K 3/10 (2006.01)
C08K 3/34 (2006.01)
C08K 3/36 (2006.01)
C08K 3/40 (2006.01)
C08K 7/28 (2006.01)

(52) U.S. Cl.
CPC ............ *C09J 163/00* (2013.01); *C08G 59/4246* (2013.01)
USPC ........... 525/113; 523/457; 523/460; 523/466; 523/467; 525/65; 525/111; 525/122; 525/404; 525/407; 525/438; 525/454

(58) Field of Classification Search
None
See application file for complete search history.

(56) References Cited

U.S. PATENT DOCUMENTS

| 3,227,668 | A |   | 1/1966  | Ackermann et al. |
|-----------|---|---|---------|------------------|
| 4,766,183 | A |   | 8/1988  | Rizk et al.      |
| 4,888,124 | A |   | 12/1989 | Blum et al.      |
| 5,001,194 | A |   | 3/1991  | Henton           |
| 5,331,062 | A | * | 7/1994  | Sorathia et al. ............... 525/454 |
| 5,965,256 | A | * | 10/1999 | Barrera .......................... 428/354 |
| 6,077,601 | A |   | 6/2000  | DeVoe et al.     |
| 6,258,138 | B1 |  | 7/2001  | DeVoe et al.     |
| 6,322,890 | B1 |  | 11/2001 | Barron et al.    |
| 6,359,027 | B1 |  | 3/2002  | Dahlke et al.    |
| 6,368,438 | B1 |  | 4/2002  | Chang et al.     |
| 6,372,336 | B1 |  | 4/2002  | Clausen et al.   |
| 6,387,470 | B1 |  | 5/2002  | Chang et al.     |
| 7,005,394 | B1 |  | 2/2006  | Ylitalo et al.   |
| 7,288,604 | B2 | * | 10/2007 | Kuntimaddi et al. .......... 525/454 |
| 2003/0092777 | A1 |  | 5/2003 | Leitner |
| 2003/0119987 | A1 | * | 6/2003 | Eadara et al. .................. 525/107 |
| 2009/0280318 | A1 |  | 11/2009 | Matsugi et al. |
| 2010/0021406 | A1 |  | 1/2010 | Raineau et al. |
| 2010/0108258 | A1 |  | 5/2010 | Finter et al. |
| 2011/0120646 | A1 | * | 5/2011 | Gorodisher et al. .......... 156/330 |
| 2013/0020832 | A1 |  | 1/2013 | Finter et al. |
| 2013/0034736 | A1 | * | 2/2013 | Gossi et al. .................... 428/418 |

FOREIGN PATENT DOCUMENTS

| CN | 1774220 A        | 5/2006    |
| EP | 0 204 970 A2     | 12/1986   |
| EP | 0 230 666 A2     | 12/1986   |
| EP | 0 922 720 A1     | 6/1999    |
| EP | 1155084 A1       | 11/2001   |
| EP | 2 182 025 A1     | 5/2010    |
| EP | 2368955 A1 *     | 9/2011    |
| JP | 62-197413 A      | 9/1987    |
| JP | 2003-294329 A    | 12/1991   |
| JP | 2003-201325 A    | 7/2003    |
| WO | WO 00/02968 A1   | 1/2000    |
| WO | WO 00/27920 A1   | 5/2000    |
| WO | WO 2008/059056 A1| 5/2008    |
| WO | WO 2009/016106 A1| 2/2009    |

OTHER PUBLICATIONS

Derwent accession No. 2011-M30444 for U.S. 2013/0034736 and EP 2,368,955 A1, Finter et al., Sep. 28, 2011, one page.*
International Search Report (PCT/ISA/210) issued on May 30, 2011, by the European Patent Office as the International Searching Authority for International Application No. PCT/EP2011/054647.
R. E. Touhsaent et al., "Epoxy/Acrylic Simultaneous Interpenetrating Networks", J. Polymer Sci.: Symposium, 1974, No. 46, pp. 175-190, XP-002597611.
International Search Report (PCT/ISA/210) issued on May 30, 2011, by the European Patent Office as the International Searching Authority for International Application No. PCT/EP2011/054642.
International Preliminary Report on Patentability dated Oct. 2, 2012 issued in PCT/EP2011/054647.
Written Opinion dated Oct. 2, 2012 issued in PCT/EP2011/054647.
International Preliminary Report on Patentability dated Oct. 2, 2012 issued in PCT/EP2011/054642.
Written Opinion dated Oct. 2, 2012 issued in PCT/EP2011/054642.
IUPAC Compendium of Chemical Terminology, 2nd Edition (1997), 1996, 68, 2305, 2 pages.
Matthias Gossi et al., U.S. Appl. No. 13/627,359, filed Sep. 26, 2012.
EPON Resin Structural Reference Manual, EPON Resins-EPI-CURE Curing Agents-HELOXY Modifiers, Appendix 1, EPON Resin-Curing Agent Systems, Resolution Performance Products 2001.
Notification of the Third Office Action issued on Jun. 19, 2014 by the Chinese Patent Office for corresponding Chinese Patent Application No. 201180021943.7 and English translation of Chinese Office Action (13 pages).
Office Action issued on Aug. 26, 2014 by the Japanese Patent Office in corresponding Japanese Patent Application No. 2013-501772, and English translation thereof.

* cited by examiner

*Primary Examiner* — Robert Sellers
(74) *Attorney, Agent, or Firm* — Buchanan Ingersoll & Rooney PC

(57) ABSTRACT

A composition including at least one curable structural adhesive, and at least one chemically cross-linked elastomer, wherein the chemically cross-linked elastomer is present in the structural adhesive as penetrating polymer network. Such a composition constitutes a so-called shape memory material and is suitable for reinforcing cavities in structural components, such as, for example, in automobile bodies.

9 Claims, 3 Drawing Sheets

SHAPE MEMORY MATERIAL BASED ON A STRUCTURAL ADHESIVE

RELATED APPLICATION(S)

This application claims priority as a continuation application under 35 U.S.C. §120 to PCT/EP2011/054647, which was filed as an International Application on Mar. 25, 2011 designating the U.S., and which claims priority to European Application No. 10158077.7 filed in Europe on Mar. 26, 2010. The entire contents of these applications are hereby incorporated by reference in their entireties.

FIELD

Disclosed are compositions comprising curable structural adhesives, which are formed as so-called shape memory materials. Furthermore, the disclosure relates to a reinforcing element for reinforcing cavities of structural components, such as those used, for example, in automobile bodies and the like.

BACKGROUND

Hollow structural components can be used for designs of any kind. This type of construction can allow to keep the weight of the design and material expenses low. However, in this type of construction, stability and strength can be lost. In addition, the cavities provide, due to the larger surface of the hollow component, a larger contact surface for corrosion if moisture or dirt enters. Noise caused, for example, by wind or vibration can also be transferred in or along the cavities.

Due to the shape and/or the narrow dimensions of such cavities it can be difficult to reinforce them efficiently, to insulate them or to control noise transfer.

Local reinforcing elements in the components can be used or integrated, for example, to improve the mechanic properties of hollow structural components. Such reinforcing elements can include metals or plastics or a combination of these materials. In locations that are difficult to access, which can, for example, only be reinforced or sealed after the installation of the component, structure foams can be used. This is the case, for example, in the production of vehicle structures or bodies. An exemplary benefit of structure foams is that they can be installed in a cavity in an unexpanded state and can be foamed later, for example, by an increase of temperature.

In this manner, the inner wall of the cavity can, for example, also be completely coated after the installation of the reinforcement elements by way of cathodic dip coating (KTL) and only afterwards reinforced by foaming of the structural adhesive. For this, the foaming can be done during the curing of the KTL layer in the oven.

A disadvantage of such reinforcing elements is that the mechanic properties of the structural adhesive are affected by the foaming process.

SUMMARY

According to an exemplary aspect, a composition is provided, comprising: i) at least one curable structural adhesive; and ii) at least one chemically cross-linked elastomer; wherein the chemically cross-linked elastomer is present in the structural adhesive as a penetrating polymer network.

According to an exemplary aspect, a method for producing an exemplary composition is provided, the method comprising: —mixing the epoxy resin A with at least one hardener B; —adding and admixing a hardener H; and—reacting the epoxy resin A with the hardener H; or—mixing the epoxy resin A with at least one hardener H and one hardener B; and—reacting the epoxy resin A with the hardener H at a temperature below the activation temperature of hardener B.

According to an exemplary aspect, a molded article formed from an exemplary composition, wherein the molded article is subjected to a reversible forming method comprising: —heating the composition to a temperature above its glass transition temperature $T_g$; —deforming the composition, under tension of the chemically cross-linked elastomer; and—cooling down the deformed composition below its glass transition temperature $T_g$.

According to an exemplary aspect, a reinforcing element for reinforcing cavities of structural components, comprising a support to which a molded article formed from an exemplary composition is attached, wherein the molded article is subjected to a reversible forming method comprising: —heating the composition to a temperature above its glass transition temperature $T_g$; —deforming the composition, under tension of the chemically cross-linked elastomer; and—cooling down the deformed composition below its glass transition temperature $T_g$.

According to an exemplary aspect, a reversible forming method is provided, comprising: —heating the composition according to claim 1 to a temperature above its glass transition temperature $T_g$; —deforming the composition, under tension of the chemically cross-linked elastomer; and—cooling down the deformed composition below its glass transition temperature $T_g$.

According to an exemplary aspect, a method for reinforcing cavities of structural components is provided, the method comprising: a') placing the reinforcing element according to claim 11 in a cavity of a structural component; b') heating the molded article on the reinforcing element to a temperature above the glass transition temperature $T_g$ of the composition; and c') curing the curable structural adhesive.

BRIEF DESCRIPTION OF THE DRAWINGS

Exemplary embodiments of the disclosure are described in more detail in the drawings. The same elements in the different figures are marked with the same reference signs. The disclosure is not limited to exemplary embodiments shown and described.

The figures show the following.

Figure 1:
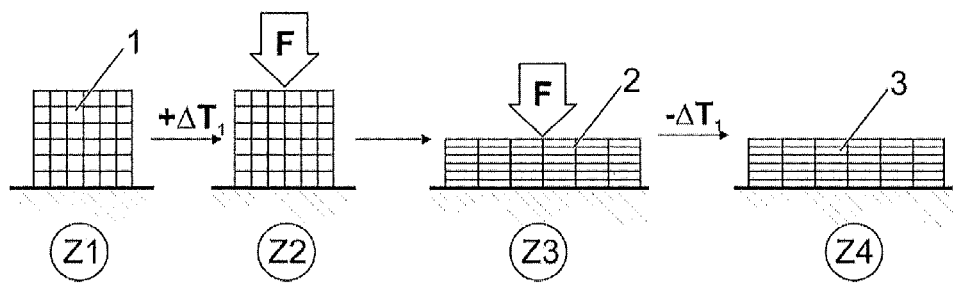
FIG. 1 is a schematic diagram of the production of a molded article or a composition in its temporary shape, according to an exemplary aspect.

The figures show exemplary elements.

DETAILED DESCRIPTION

According to an exemplary embodiment, a reinforcing element is provided, which ameliorates or overcomes the disadvantages of comparative reinforcing elements and allows to close a gap between cavity and reinforcing element without affecting the mechanic properties of the structural adhesive.

It was found that compositions according to an exemplary embodiment can realize shape memory materials, which change their shape, for example, due to the influence of temperature and thus expand in the desired direction without an accompanied increase in volume, for example, through a foaming process.

In a first exemplary aspect, a composition is provided comprising
i) at least one curable structural adhesive; and
ii) at least one chemically cross-linked elastomer;
wherein the chemically cross-linked elastomer is present in the structural adhesive as penetrating polymer network.

The term "penetrating polymer network" includes a semi-interpenetrating polymer network (SIPN)) according to IUPAC Compendium of Chemical Terminology, 2nd Edition (1997). The SIPN comprises at least one network and at least one linear or branched polymer, wherein this polymer at least partially penetrates the network. In an exemplary composition, the elastomer forms the network, and the polymer is a part of the curable structural adhesive.

A "chemically cross-linked elastomer" is an elastomer which is cross-linked through covalent chemical bonds. Contrary to that, the cross-linking of a thermoplastic elastomer is based on physical interactions. A chemically cross-linked elastomer differs from a thermoplastic elastomer due to the fact that it swells in a suitable solvent, but does not dissolve. Conversely, a thermoplastic elastomer dissolves completely in a suitable solvent.

The presence of a chemically cross-linked elastomer can be determined, for example, in accordance with ASTM D 2765.

The glass transition temperature $T_g$ of a composition is understood to be the glass transition temperature of the curable structural adhesive, i.e., for example, of the epoxy resin A, or the glass transition temperature of the chemically cross-linked elastomer, depending on which one is higher. For example, in embodiments with a curable structural adhesive based on a solid epoxy resin the glass transition temperature $T_g$ of the composition can relate to the glass transition temperature $T_g$ of the solid epoxy resin. For example, in embodiments with a curable structural adhesive based on a liquid epoxy resin the glass transition temperature $T_g$ of the composition can relate to the glass transition temperature $T_g$ of the chemically cross-linked elastomer.

The glass transition temperature $T_g$ and melting points can be measured by DSC (Differential Scanning calorimetry), wherein the measurements are performed with a Mettler Toledo 822e device at a heating rate of 10° C./min to 180° C. on 5 mg samples. The measuring values can be determined from the measured DSC curve with the help of the DSC software.

An exemplary composition, which represents a "shape memory material," can be formed in a certain shape ("original shape") during its production or processing and can have a solid consistency after this forming. The composition exists at a temperature below its glass transition temperature $T_g$. In this shape, the chemically cross-linked elastomer, which exists as a penetrating polymer network in the structural adhesive, is substantially relaxed. If desired, the composition can then be heated to a temperature above its glass transition temperature $T_g$ and formed into any shape ("temporary shape"). In this temporary shape, the elastomer is present in a strained state. The composition is held in this temporary shape and the temperature of the composition is lowered again below the glass transition temperature $T_g$ or below the melting point of the structural adhesive, causing the composition to harden in the temporary shape. In this temporary shape, the composition is stable when stored and can be subjected to processing, for example punching or cutting. If, at a later time, the composition is reheated to a temperature above its glass transition temperature $T_g$, the elastomer regains its relaxed shape and thus deforms the entire composition into its original shape.

According to an exemplary aspect, provided is a shape memory material comprising an exemplary composition.

For example, an exemplary composition is a shape memory material, which is solid at room temperature (23° C.), allowing optimal handling of the material in its original and in its temporary shape.

For an exemplary composition to be solid at room temperature, it can have a glass transition temperature $T_g$ above room temperature. Otherwise, an exemplary composition, after it is brought into its temporary shape, may not keep the elastomer, which is strained in this temporary shape, in this shape at room temperature.

For example, the exemplary composition according to the disclosure has a glass transition temperature $T_g$ in the range of 23° C. to 95° C., for example, 30° C. to 80° C., for example, from 35° C. to 75° C.

Furthermore, for example, the surface of the composition is at room temperature not sticky, thereby facilitating its handling.

For example, the curable structural adhesive is a hot-curing structural adhesive, which can have a curing temperature in the range of 120° C. to 220° C., for example, 160° C. to 200° C.

If the curable structural adhesive is a hot-curing structural adhesive, it can be desirable to keep in mind during processing of the composition, during which it is formed into its temporary shape, that the composition is not heated to a point that the curing process begins.

For example, the curable structural adhesive is an epoxy resin composition comprising at least one epoxy resin A and at least one hardener B for epoxy resins, which is activated by an increased temperature. For example, it is a one-component epoxy resin composition.

For example, the epoxy resin A, on average, has more than one epoxy group per molecule and, for example, is a solid epoxy resin or a mixture of a solid epoxy resin with a liquid epoxy resin. The term "solid epoxy resin" is well understood to the person skilled in the art of epoxy and is used as opposed to "liquid epoxy resin." The glass transition temperature $T_g$ of solid epoxy resins is above room temperature.

Exemplary solid epoxy resins have the following formula (I).

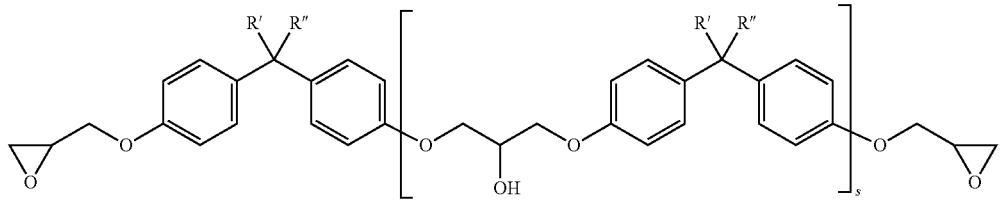

(I)

In an exemplary embodiment, the substituents R' and R" represent independently from one another either H or $CH_3$. Furthermore, the index s represents a value of ≥1, for example, ≥1.5, for example, 2 to 12.

Exemplary solid epoxy resins have a glass transition temperature $T_g$ in the range of 23° C. to 95° C., for example, 30° C. to 80° C., for example, 35° C. to 75° C.

Such solid epoxy resins are commercially available, for example, from Dow Chemical Company, USA, from Huntsman International LLC, USA, or from Hexion Specialty Chemicals Inc, USA.

Exemplary liquid epoxy resins, which, for example, can be used together with a solid epoxy resin, have the following formula (II).

Depending on the embodiment, the epoxy resin, which can be used as one of the starting materials in the curable structural adhesive, can also be a liquid epoxy resin. This can be the case, for example, when the curable structural adhesive comprises at least one chemically cross-linked elastomer to form a shape memory material, wherein the chemically cross-linking of the polymer components for the production of this elastomer, i.e., of the elastomer-forming components, results in an increase of the glass transition temperature $T_g$ of the composition, so that it is in an area suitable for the handling of the material. For example, this can be the case if the chemically cross-linked elastomer is at least partially formed from the liquid epoxy resin used.

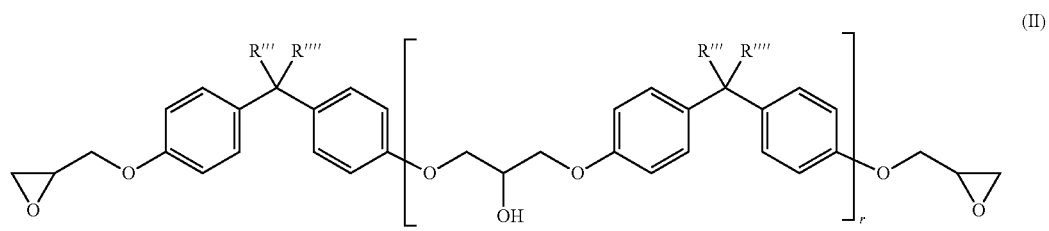

(II)

In an exemplary embodiment, the substituents R' and R" represent independent from one another either H or $CH_3$. Furthermore, the index r represents a value of 0 to 1. For example, r represents a value of ≤0.2.

For example, these are diglycidyl ethers of bisphenol A (DGEBA), of bisphenol F and of bisphenol A/F. In an exemplary embodiment, the term "A/F" refers to a mixture of acetone with formaldehyde, which is used as starting material in its production. Such liquid resins are commercially available, for example, under the trade names Araldite® GY 250, Araldite® PY 304, Araldite® GY 282 from Huntsman International LLC, USA, or D.E.R.® 331 or D.E.R.® 330 from Dow Chemical Company, USA, or under the trade names Epikote® 828 or Epikote® 862 from Hexion Specialty Chemicals Inc, USA.

Additional suitable exemplary epoxy resins are so-called novolacs. For example, they have the following formula (III).

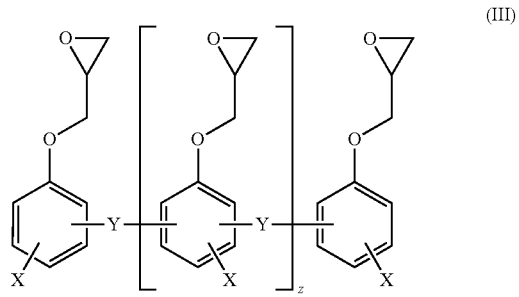

(III)

In an exemplary embodiment, the moiety X represents a hydrogen atom or a methyl group. The moiety Y represents —$CH_2$— or a moiety of the formula (IV).

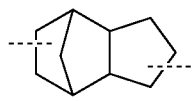

Furthermore, the index z represents a value of 0 to 7, for example, a value of ≥3.

For example, these are phenol or cresol novolacs (Y represents —CH$_2$—).

Such epoxy resins are commercially available under the trade name EPN or ECN and Tactix® 556 from Huntsman International, LLC, USA, or under the product series D.E.N.™ from Dow Chemical Company, USA.

For example, the epoxy resin A constitutes a solid epoxy resin of the formula (I). In a further exemplary embodiment, the hot-curing epoxy resin composition contains at least one solid epoxy resin of the formula (I) and also at least one liquid epoxy resin of the formula (II).

The proportion of epoxy resin A amounts to, for example, 2 to 90% by weight, for example, 5 to 70% by weight, for example, 10 to 60% by weight, based on the total weight of the curable structural adhesive.

The hardener B for epoxy resins is activated by an increased temperature. For example, the hardener B is a hardener, selected from the group consisting of dicyandiamide, guanamine, guanidine, amino guanidine and derivatives thereof; substituted ureas, for example, 3-(3-chloro-4-methyl-phenyl)-1,1-dimethyl urea (chlortoluron), or phenyl-dimethyl-ureas, for example, p-chloro-phenyl-N,N-dimethyl-urea (monuron), 3-phenyl-1,1-dimethyl-urea (fenuron), 3,4-dichloro-phenyl-N,N-dimethyl-urea (diuron), and imidazoles and amine complexes.

An example of hardener B is dicyandiamide, for example, in combination with a substituted urea. An exemplary benefit of the combination of dicyandiamide with a substituted urea is the resulting accelerated curing of the composition.

For example, the proportion of the hardener B amounts to 0.05 to 8% by weight, for example, 0.1 to 6% by weight, for example, 0.2 to 5% by weight, based on the total weight of the curable structural adhesive.

The term "hardener" can include catalysts and catalytically active compounds. In this case, it is clear to the person skilled in the art that when a catalyst or a catalytically active compound is used as hardener B, the proportion of hardener B in the total curable structural adhesive can be in the lower range of the indicated range of values.

In addition, the epoxy resin composition may comprise at least one impact strength modifier.

An "impact strength modifier" can include an addition of an organic polymer to an epoxy resin matrix, which in small amounts, for example, between 0.1 and 20% by weight, can effect a significant increase of strength and is therefore able to accept a higher shock or impact stress before the matrix rips or breaks.

Suitable exemplary impact strength modifiers include, for example, reactive liquid rubbers based on nitrile rubber or derivatives of polyether polyol polyurethanes, core shell polymers and any other suitable systems.

Suitable exemplary impact strength modifiers are described as impact strength modifiers D in the European patent document No. EP 08168009.2, the entire content of which is hereby incorporated by reference in its entirety.

The curable structural adhesive can comprise additional components suitable for use in curable structure adhesives.

For example, the curable structural adhesive can additionally comprise at least one filler. For example, it is mica, talcum, caolin, wollastonite, feldspar, syenith, chlorite, bentonite, montmorillonite, calcium carbonate (precipitated or milled), dolomite, quartz, silicic acid (pyrogen or precipitated), cristobalite, calcium oxide, aluminum hydroxide, magnesium oxide, hollow ceramic spheres, hollow glass spheres, hollow organic spheres, glass spheres, color pigments. Fillers can include both organically coated and also uncoated commercially available forms that are suitable for use. Another example includes functionalized alumoxanes, such as those described in U.S. Pat. No. 6,322,890, the entire content of which is hereby incorporated by reference in its entirety.

For example, the proportion of the filler amounts to 1 to 60% by weight, for example, 5 to 50% by weight, for example, 10 to 35% by weight, based on the weight of the total curable structural adhesive.

As additional components the curable structural adhesive can comprise, for example, thixotropic set-up agents such as, for example, aerosols or nanoclays, strength modifiers, reactive diluents as well as other suitable components.

For example, the composition comprises no chemical propellant or other agent, which results in foaming of the composition.

For example, the curable structural adhesive is a one-component, hot-curing epoxy resin composition.

An exemplary composition can have at least one chemically cross-linked elastomer, which is present in the structural adhesive as penetrating polymer network.

The chemically cross-linked elastomer can be added to the composition by mixing elastomer-forming components with the curable structural adhesive and followed by cross-linking in the mixture, resulting in a penetrating polymer network.

For example, elastomer-forming components can also be any components which can be cross-linked in the mixture with the curable structural adhesive in a controlled manner without negatively impacting the curable structural adhesive in its function.

For example, the elastomer-forming components can be selected from the group consisting of at least one natural or synthetic rubber, and at least one curing agent for rubber; and at least one polyisocyanate, and at least one polyol.

In addition to natural rubber, i.e., polyisoprene, suitable synthetic rubbers can include styrene butadiene rubber, polybutadiene rubber, acrylonitrile butadiene rubber, for example, with an acrylonitrile proportion of ≤25 mol-%, chloroprene rubber and ethylene propylene diene rubber.

The components can be cross-linked with sulfur, radically or in any suitable manner.

The elastomer-forming components can be polyisocyanates and polyols. For example, the polyisocyanates can be commercial diisocyanates such as, for example, diphenyl-methane-diisocyanate (MDI), toluylene-diisocyanate (TDI), 1,6-hexamethylene-diisocyanate (HDI) or 1-isocyanato-3,3,5-trimethyl-5-isocyanato-methyl-cyclohexane (IPDI).

These polyols are, for example, polymeric polyols, for example, difunctional or trifunctional polyols. Suitable polymer polyols can include polyether polyols, polyester polyols, polycarbonate polyols and mixtures of these polyols. For example, the polymer polyols have a molecular weight of 500 to 5000 g/mol.

When preparing an exemplary composition, the curable structural adhesive is mixed with elastomer-forming components until a homogeneous mixture is obtained. If the curable structure adhesive comprises a solid epoxy resin as epoxy resin A, the mixing can be done at a temperature above the glass transition temperature $T_g$ of the solid epoxy resin.

For example, if the curable structural adhesive is a hot-curing epoxy resin composition, it can be mixed with the elastomer-forming components, before the hardener is added. As a result, during mixing the temperature can be set up to or even above the curing temperature of the hot-curing epoxy resin composition, without curing of the structural adhesive. For example, a more efficient mixing is obtained at higher temperatures.

After a homogeneous mixture is obtained, the elastomer-forming components can be cross-linked, so that they form an elastomer, which is present as penetrating polymer network in the structural adhesive.

The proportion of chemically cross-linked elastomer can amount to 1 to 40% by weight, for example, 10 to 20% by weight, based on the total weight of the composition.

In an exemplary embodiment, the chemically cross-linked elastomer is formed of components of the curable structural adhesive.

In an exemplary embodiment, a composition has a chemically cross-linked elastomer, which is present in the structural adhesive as penetrating polymer network, wherein it is formed from epoxy resin A and at least one additional hardener H for epoxy resins.

The hardener H can be a molecule or a polymer, which has functional groups reacting with epoxy groups, for example, having a medium functionality of >2 to 5 and a mean equivalence weight of 40 to 2000 g/eq. In this case, functionality is understood to be the functionality vis-à-vis epoxy groups.

The activation temperature of hardener H can be below the activation temperature of hardener B, which is described above. For example, the activation temperature of hardener H is at least 10° C., for example, at least 20° C., for example, at least 30° C., below the activation temperature of hardener B.

In addition, the stoichiometric ratio of the total reactive groups of hardener H and hardener B to the epoxy groups of the epoxy resin A is in the range of ≤0.9:1.

Hardener H is a molecule or a polymer, which has functional groups that are reacting with epoxy groups. For example, it is a polymer, wherein this polymer is, for example, selected from the group consisting of polyolefin, polyether, polyester, fatty acid, fatty acid amide and acrylonitrile butadiene rubber with an acrylonitrile proportion of ≤25 mol-%.

Hardener H can have a base structure, which does not unmix from the rest of the composition, for example, from the epoxy resin A, as some elastomers which are added as impact strength modifiers to epoxy resin compositions may do. For example, this can be the case with acrylonitrile butadiene rubber with a low acrylonitrile proportion of, for example, below 25 mol-%.

For example, such hardeners H increase flexibility.

The functional groups of hardener H, which react with epoxy groups can be, for example, amino, carboxyl, carboxylamide, hydroxyl or anhydride groups. For example, they are amino or carboxyl groups or phenolic hydroxyl groups, for example, amino or carboxyl groups. Carboxyl groups are exemplary, since the composition can have a better storage stability after being cross-linked with hardener H, but before being cross-linked with hardener B. An exemplary reason for this is that reacted amines, which can be present in the composition as tertiary amines, can catalyze the homopolymerization of the epoxy groups.

The mean functionality of the polymer can be in the range of >2 to 5, for example, from 2.5 to 5, for example, from 3 to 5. The mean equivalence weight of the polymer can be in the range of 40 to 1000 g/eq., for example, from 40 to 1000, for example, from 50 to 800. In this context, the equivalence weight is the ratio of the molecular weight of the entire polymer, i.e., of the hardener H, to its functionality, i.e., to the number of functional groups reacting with epoxy groups.

For example, the hardener H is a diamine such as 4,9-dioxadodecan-1,12-diamine or polyether-polyamine, which is commercially available from Huntsman International LLC, USA, for example, under the trade name Jeffamine®, for example, Jeffamine® D-230 or T-403, or a dimeric or trimeric fatty acid, which are commercially available from Croda International PLC, England, for example, under the trade name Pripol™, for example, Pripol™ 1040.

The hardener B, which can also be used in this exemplary embodiment of the composition, is described above.

For example, the stoichiometric ratio of the reactive groups of hardener H to the reactive groups of hardener B is in the range of ≤1:1.

In an exemplary embodiment, a composition is made of shape memory material and has a form stability that is as high as possible in the temporary shape and an elastic recovery that is as complete as possible. For example, the composition can maintain the temporary shape as long as possible, for example, for more than 6 months, and that, if desired, the composition can also regain its original shape through heating above the glass transition temperature $T_g$ of the composition. For example, sufficient elastic recovery can be the case if a specimen of a composition with a height from 5 to 10 mm deformed by 50% in height, can be returned to 80 to 100% of the original height.

In an exemplary embodiment where the composition has a chemically cross-linked elastomer which is formed from an epoxy resin A and at least one hardener H for epoxy resins, the cross-linking of the epoxy resin A with the hardener H can cause these properties.

In an exemplary embodiment, the cross-linking of the remaining epoxy groups of the epoxy resin A with the hardener B can cause a sufficient adhesion of the structural adhesive. In an exemplary embodiment, the proportion of the hardener H in the composition is, for example, only so high that it produces a shape memory material with said properties, so that as many epoxy groups of the epoxy resin A as possible are available for curing with hardener B, i.e., for building of the adhesion.

An exemplary composition can be produced by an exemplary method including:
 mixing the epoxy resin A with at least one hardener B;
 adding and admixing a hardener H;
 reacting the epoxy resin A with the hardener H;
or
 mixing the epoxy resin A with at least one hardener H and one hardener B;
 reacting the epoxy resin A with the hardener H at a temperature below the activation temperature of hardener B.

For example, hardener H can be a hardener, which reacts with the epoxy resin at room temperature or at a significantly lower temperature than hardener B, so that no or only little heat energy is employed to produce an exemplary composition, for example, a shape memory material.

In another exemplary aspect, a molded article is disclosed, which is subjected to a reversible forming, wherein the forming comprises the following steps:
a) heating a composition, as described above, to a temperature above its glass transition temperature $T_g$;
b) deforming the composition, under tension of the chemically cross-linked elastomer;

c) cooling the deformed composition below its glass transition temperature $T_g$.

FIG. 1 shows a schematic of an exemplary production of a molded article from an exemplary composition based on an epoxy resin composition, as described above.

In an exemplary embodiment, the solid composition 1 is present in its initial state Z1 in the original shape, into which it was formed, for example, at production. In a first step, the composition is then heated by a temperature $\Delta T_1$ to a temperature, which is above its glass transition temperature $T_g$, however, in the case of a hot-curing epoxy resin composition, below its curing temperature. When the composition is in this state Z2, it will be formed in its temporary, still deformable shape 2 by impact of a force F. In this temporary, still deformable shape, as shown in state Z3, the chemically cross-linked elastomer is in a strained shape. The composition is maintained in this temporary shape and the temperature of the composition is again lowered by the temperature $\Delta T_1$ to a temperature below its glass transition temperature $T_g$. In this process, the composition hardens and is now present in its solid temporary shape 3, as shown in state Z4. In this state as a molded article, the composition is stable when stored and can be processed further. For example, the molded article can be punched or cut and/or, for example, can be attached to a support or arranged in a cavity of a structural component in which strengthening is desired.

For example, the deformation of the composition, where it is formed into its temporary shape, can be done by pressing, rolling, extruding or the like. For the deformation, the composition in the deformed state can be cooled down to a temperature below its glass transition temperature $T_g$, so that it remains in its temporary shape.

In another exemplary aspect, a reinforcing element for reinforcing cavities of structural components is disclosed comprising a support to which a molded article is attached as described above.

The support can be composed of any suitable material. For example, the support can include a plastic, a metal or a combination of a plastic and a metal.

Exemplary plastics are polyurethanes, polyamides, polyesters and polyolefins and polyolefin copolymers, for example, high temperature-resistant polymers such as poly (phenyleneethers), polysulfones or polyethersulfones. Exemplary plastics are polyamides (PA) such as PA6 or PA66, polyethlyene and polypropylene, and polystyrene and copolymers such as acrylonitrile butadiene styrene (ABS). Exemplary metals are aluminum, steel, nickel and alloys thereof. The metal can be present in an untreated form or it can be pretreated with suitable agents, for example, to prevent corrosion or to improve the adhesion.

In addition, the support can have any suitable composition and any structure. It can, for example, be solid, hollow or foamed or have a latticed structure. For example, the surface of the support can be smooth, rough or structured.

In addition to its exemplary function as a support for the composition or the molded article produced from it, the support can also contribute to the structural reinforcement or the sealing of the component or noise reduction.

The support can have at least one fastening means, for example, a clip, to fasten and place the reinforcement elements in a cavity. The fastening of the reinforcement element with a clip is, for example, suitable for applications, in which it is desirable for the entire surface of the component, for example, also for the inner cavity wall, for example for dip coating, to be reachable. In such cases, a fastening for example through gluing may not be suitable, since the coating may not reach the place of the bonding.

For example, the support can include a plastic which is coated with a metal. In an exemplary embodiment, the above described materials can include a plastic and a metal.

In an exemplary embodiment, the metal, with which the plastic is coated, can be attached to the plastic in any suitable manner. The fastening can be done, for example, by mechanic means of fastening such as nails, screws, rivets, mechanic clips, clamps, flanges and the like, or by bonding of the metal and the plastic. Furthermore, the metal can be applied to the plastic by plastic galvanization.

For example, the layer thickness of the metal layer on the plastic support is 0.03 to 1.5 mm.

The support made of plastic, which is coated with a metal, can have an exemplary benefit compared to a strictly metal support that it is on one hand lighter, and on the other hand, it can be varied widely in its mechanic properties and its design due to the properties of the plastic and the selection of the material and its processing. The exemplary benefit of the metal coating compared to a strictly plastic support is the fact that the metals can adhere more easily. Another exemplary benefit of the metal coating is the fact that in case of hot-curing structure adhesives the metal layer may be heated by means of induction locally and efficiently.

Figure 2:
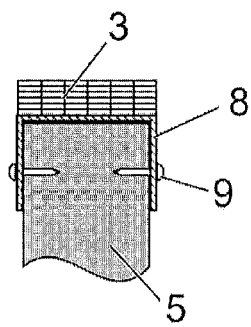
FIG. 2 is a schematic diagram of a reinforcement element, according to an exemplary aspect.

FIG. 2 shows an exemplary support 5 made of a plastic, which is coated with a metal 8. In an exemplary embodiment, the metal is attached to the support with nails 9. On the metal layer there is a molded article 3 including an exemplary composition in its temporary state.

Figure 3:
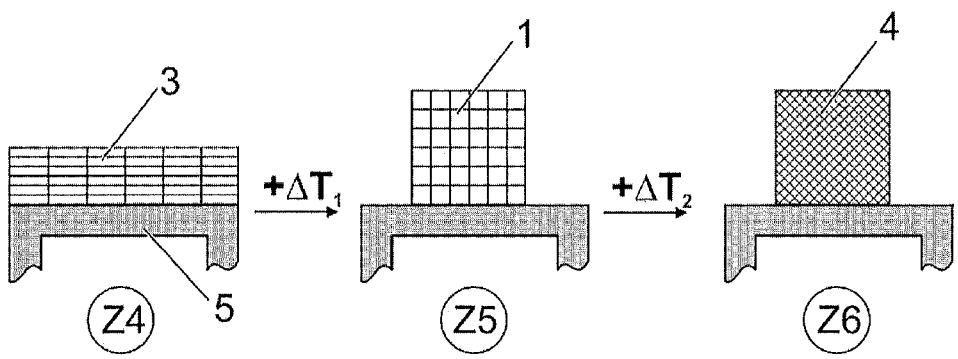
FIG. 3 is a schematic diagram of the shape change and the curing of the composition, according to an exemplary aspect.

FIG. 3 shows schematically an exemplary reinforcing element in its initial state Z4 including a support 5, to which a molded article 3 made of an exemplary composition is attached with a hot-curing epoxy resin composition as structural adhesive and chemically cross-linked elastomer in its temporary shape. In a first step, the molded article 3 is then heated by a temperature $\Delta T_1$ to a temperature, which is above the glass transition temperature $T_g$ of the composition, wherein the elastomer relaxes and leads to a deformation of the molded article or composition 1 to its original shape. This corresponds to state Z5 in FIG. 3. Then, the temperature is further increased by $\Delta T_2$ to a temperature at which the composition cures. The cured composition 4 is shown in state Z6.

The temperature increase, which leads to the deformation of the molded article, and the temperature increase for the curing of the structural adhesive, do not necessarily have to occur in two steps. For example, it is possible to have both steps occur consecutively by a steady temperature rise.

According to an exemplary embodiment, disclosed is the use of a reinforcement element for reinforcing cavities of structural components. For example, such structural components are used in bodies and/or frames of vehicles and means of transportation, for example, of water, land or air vehicles. For example, disclosed is the use of a reinforcement element in bodies or frames of automobiles, trucks, railroad wagons, boats, ships, helicopters and airplanes, for example, automobiles.

Another exemplary aspect relates to a method for reinforcing cavities of structural components comprising the steps:

a') placing a reinforcement element according to an exemplary aspect in the cavity of a structural component;

b') heating the molded article 3 on the reinforcing element to a temperature above the glass transition temperature $T_g$ of the composition, wherein the molded article reverts to its shape before the forming, i.e. to the original shape; and c') curing the curable structural adhesive.

In an exemplary embodiment for reinforcing cavities of structural components, for example, the support of the reinforcement element is made of an inductively heatable metal or a material, which is coated by an inductively heatable metal, and the curable structural adhesive is a hot-curing structural adhesive, and the steps b') and c') are effected by induction, that is, by means of an electromagnetic alternating field of an induction coil.

Figure 4:
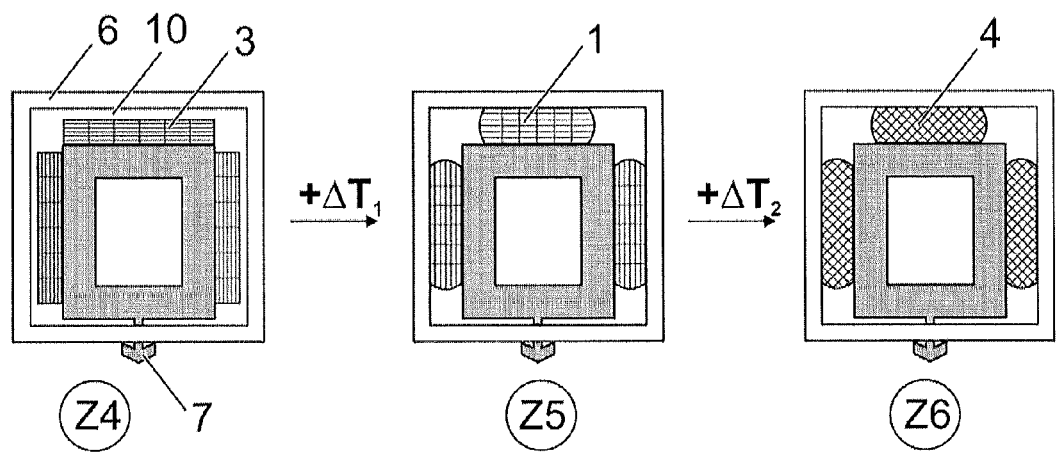
FIG. 4 is a schematic diagram of the reinforcement of a cavity of a structural component, according to an exemplary aspect.

FIG. 4 shows schematically an exemplary reinforcement in a cavity of a structural component 6, wherein on the inside of the structural component a reinforcing element is attached comprising a support 5 and several molded articles 3 made from an exemplary composition with hot-curing structural adhesive and chemically cross-linked elastomer in its temporary shape. In an exemplary embodiment, the support of the reinforcement element is attached to the structural component with a clip 7. In an exemplary embodiment, the molded article or the composition is in its temporary shape (state Z4) and is subsequently heated by a temperature $\Delta T_1$ to a temperature, which is above the glass transition temperature $T_g$ of the composition. In this process, the elastomer relaxes and leads to a deformation of the molded article or the composition 1 to its original shape, thereby closing the gap 10 left open between reinforcing element and cavity and the exemplary composition will adhere to the inner wall of the cavity (state Z5). After another temperature increase by a temperature $\Delta T_2$ the hot-curing structural adhesive cures. FIG. 4, state Z6, shows the enforced structural component with the cured composition 4.

Figure 5:
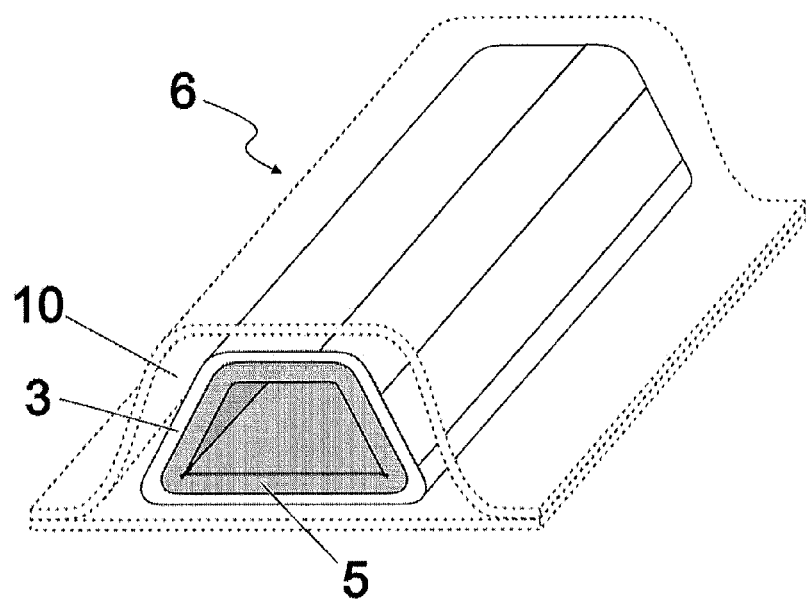
FIG. 5 is a schematic diagram of a reinforcement element in a cavity of a structural component, according to an exemplary aspect.

FIG. 5 shows an exemplary reinforcing element, as it is used in a cavity 10 of a structural component 6, prior to the deformation of the molded article or the exemplary composition in its temporary shape 3, which is located on a support 5.

Figure 6:
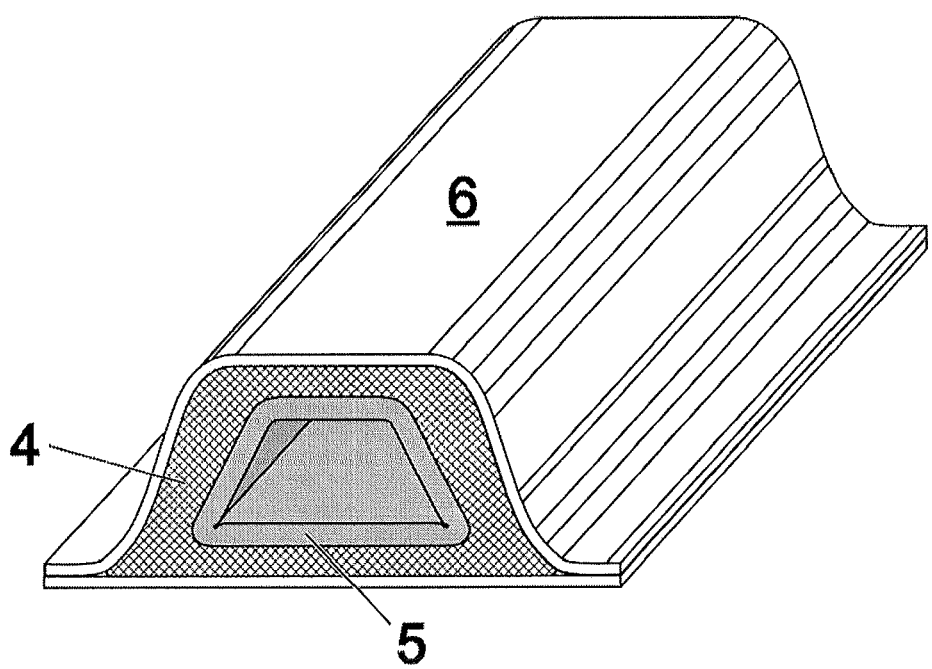
FIG. 6 is a schematic diagram of an enforced structural component, according to an exemplary aspect.

FIG. 6 shows the exemplary reinforcing element of FIG. 5, inserted in a cavity of a structural component 6, wherein in this case the molded article or the exemplary composition has already returned to its original shape and adheres to the inner walls of the structural component 6. Furthermore, FIG. 6 shows the cured composition 4.

The shape and structure of the reinforcing elements can be selected as desired, for example, according to its place of use.

Furthermore, the disclosure relates to an exemplary cured composition, as it is available from a curing process, for example, by hot-curing, from a composition described above.

EXAMPLES

Exemplary embodiments are listed below, which shall explain the described disclosure in more detail. The disclosure is not limited to the exemplary embodiments described.

Test Method

The form stability of the materials in the temporary shape was determined during a 7 day period at standard climate (23° C./50% humidity) ("relaxation"), the elastic recovery to the original shape after 7 days of storage at standard climate. The dimensions of the original shape of the specimens were 10×10×6 mm (l×w×h). The height in the original shape ($H_0$) was therefore 6 mm.

By pressing at an increased temperature and subsequent cooling, the samples were formed into the temporary shape with a height of 3 mm ($H_{Temp}$), which corresponds to a compression of 50% and thus allows a height gain of 100% when reversing.

The relaxation is defined as:

$$\text{Relaxation} [\%] = \frac{H_{Temp}(\text{day } 7) - H_{Temp}(\text{day } 0)}{H_{Temp}(\text{day } 0)} \cdot 100$$

The elastic recovery is determined as:

$$\text{Elastic recovery} [\%] = \frac{H_0(\text{day } 7, \text{ after curing})}{H_0(\text{day } 0)} \cdot 100$$

Production of Specimens

The examples 1 and 2 represent a structural adhesive based on an epoxy resin composition and a chemically cross-linked elastomer, which is built from components of the epoxy resin.

The formulations 1 and 2 were produced by mixing of the component according to Table 1 in the respective weight percentages using a speed mixer at 40° C.

The formulations 3 to 6 as well as the reference foam Ref were produced by mixing of the components according to Tables 1 and 2 in the corresponding weight percentages in a dual screw extruder at a temperature above the glass transition temperature of the solid resin or below the decomposition temperature of the chemical propellant (Ref).

In the examples 5 and 6, the polyols were reacted with the diisocyanate and, where applicable, with the catalyst before adding to the respective formulation according to a suitable method.

The formulations produced were processed into specimens in their original form with dimensions of 10×10×6 mm. Subsequently, the respective elastomer was chemically cross-linked for one hour at 90° C.

TABLE 1

Formulations 1 and 2 and reference foam Ref in % by weight, and results

|  | Ref | 1 | 2 |
|---|---|---|---|
| Araldite ® GT 7004[a] | 85.4 |  |  |
| Araldite ® GY 250[a] |  | 77.2 | 60 |
| Dicyandiamide[b] | 1.6 | 1.5 | 1.1 |
| Jeffamine ® D-230[a] |  | 13.5 |  |
| Armeen ® CD[c] |  | 7.8 |  |
| Pripol ™ 1040[d] |  |  | 14.2 |
| Bisphenol A[e] |  |  | 21.9 |
| PPh$_3$[e] |  |  | 2.8 |
| Luvopor ® OB[f] | 3 |  |  |
| Aerosil ®[g] | 10 |  |  |
| Relaxation [%] | — | 5 | 0 |
| Elastic recovery [%] | — | 100 | 100 |

[a]available from Huntsman Advanced Materials (Switzerland);
[b]available from AlzChem GmbH, Germany;
[c]available from Akzo Nobel GmbH, Sweden;
[d]available from Croda Inc., UK;
[e]available from Fluka, Switzerland;
[f]available from Lehmann&Voss&Co, Germany;
[g]available from Wacker Chemie AG, Germany

TABLE 2

Formulations 3 to 6 in % by weight, and results

|  | 3 | 4 | 5 | 6 |
|---|---|---|---|---|
| Araldite ® GT 7004 | 73 | 63 | 64 | 64 |
| Dicyandiamide | 1.5 | 1.2 | 1.2 | 1.2 |
| Nipol ® 1072 (rubber)[a] | 20 | 30 |  |  |

TABLE 2-continued

Formulations 3 to 6 in % by weight, and results

|  | 3 | 4 | 5 | 6 |
|---|---|---|---|---|
| Dibenzoylperoxide[b] | 0.6 | 0.6 | | |
| Desmophen ® 3060 BS (polyol)[c] | | | 14 | |
| Acclaim ® 4200 (polyol)[c] | | | 14 | 24.37 |
| Takenate ® 500 (polyisocyanate)[d] | | | 4 | |
| Desmodur ® 3400 (polyisocyanate)[c] | | | | 7.7 |
| Dibutyl tin dilaurate | | | | 0.03 |
| Purmol ® 13[e] | | | 1.6 | 1.6 |
| Aerosil ® | 5 | 5 | 1 | 1 |
| Relaxation [%] | 0 | 0 | 0 | 0 |
| Elastic recovery [%] | 80 | 95 | 75 | 50 |

[a]available from Zeon Chemicals, USA;
[b]available from Arkema, France;
[c]available from Bayer MaterialScience, Germany;
[d]available from Mitsui Chemicals, Japan;
[e]available from Zeochem AG, Switzerland.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SIGNS

1 composition in the original shape
2 composition (deformable)
3 molded article (temporary shape)
4 cured composition
5 support
6 structural component
7 clip
8 metal layer
9 nail
10 gap
Z1 state of the composition in original shape
Z2 state of the deformable composition
Z3 state of the composition in the temporary state (molded article)
Z4 state of the cured composition
ΔT₁ temperature difference between temperature below the $T_g$ of the composition and temperature above the $T_g$ of the composition
ΔT₂ temperature difference between temperature above the $T_g$ of the composition and the curing temperature of the composition

What is claimed is:

1. A composition, comprising:
   i) at least one curable structural adhesive that is a hot-curing epoxy resin composition comprising at least one epoxy resin A and at least one hardener B for epoxy resin, which is activated by an increased temperature; and
   ii) at least one chemically cross-linked elastomer selected from the group consisting of:
      an elastomer formed from elastomer-building components including at least one natural or synthetic rubber and at least one cross-linking agent for rubber; and
      an elastomer formed from an epoxy resin A and at least one additional hardener H for epoxy resin;
   wherein the chemically cross-linked elastomer is present in the structural adhesive as a penetrating polymer network.

2. The composition according to claim 1, wherein the composition is obtained by a process comprising:
   mixing at least one curable structural adhesive with elastomer-building components; and
   cross-linking the elastomer-building components in the mixture to an elastomer so that a penetrating polymer network is formed in the structural adhesive.

3. The composition according to claim 2, wherein the chemically cross-linked elastomer includes the elastomer formed from elastomer-building components including:
   at least one natural or synthetic rubber and at least one cross-linking agent for rubber.

4. The composition according to claim 1, wherein the chemically cross-linked elastomer includes the elastomer formed from an epoxy resin A and at least one additional hardener H for epoxy resin,
   wherein the hardener H is a molecule or polymer, which has functional groups reacting with epoxide groups having a mean functionality of >2 to 5 and a mean equivalence weight of 40 to 2000 g/eq.;
   wherein the activation temperature of the hardener H is below the activation temperature of the hardener B; and
   wherein the stoichiometric ratio of the sum of the reactive groups of hardener H and hardener B to the epoxide groups of the epoxy resin A is in the range of greater than or equal to 0.9:1.

5. The composition according to claim 4, wherein the stoichiometric ratio of the reactive groups of hardener H to the reactive groups of hardener B is greater than or equal to 1:1.

6. The composition according to claim 4, wherein the hardener H is a polymer having amino or carboxyl groups, wherein the polymer is selected from the group consisting of a polyolefin, polyether, polyester, fatty acid, fatty acid amide and acrylonitrile butadiene rubber with an acrylonitrile proportion of greater than or equal to 25 mol-%.

7. The composition according to claim 6, wherein the hardener H is a polyether polyamine.

8. A method for producing the composition according to claim 4, the method comprising:
   mixing the epoxy resin A with at least one hardener B;
   adding and admixing a hardener H; and
   reacting the epoxy resin A with the hardener H;
   or
   mixing the epoxy resin A with at least one hardener H and one hardener B; and
   reacting the epoxy resin A with the hardener H at a temperature below the activation temperature of hardener B.

9. A reversible forming method, comprising:
   heating the composition according to claim 1 to a temperature above its glass transition temperature $T_g$;
   deforming the composition, under tension of the chemically cross-linked elastomer; and
   cooling down the deformed composition below its glass transition temperature $T_g$.

* * * * *